(12) United States Patent
Qiu et al.

(10) Patent No.: US 10,182,414 B2
(45) Date of Patent: Jan. 15, 2019

(54) ACCURATELY TRACKING A MOBILE DEVICE TO EFFECTIVELY ENABLE MOBILE DEVICE TO CONTROL ANOTHER DEVICE

(71) Applicant: Board of Regents, The University of Texas System, Austin, TX (US)

(72) Inventors: Lili Qiu, Austin, TX (US); Wenguang Mao, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/368,061

(22) Filed: Dec. 2, 2016

(65) Prior Publication Data
US 2017/0164321 A1    Jun. 8, 2017

Related U.S. Application Data

(60) Provisional application No. 62/263,411, filed on Dec. 4, 2015.

(51) Int. Cl.
*H04W 64/00* (2009.01)
*H04W 48/16* (2009.01)
(Continued)

(52) U.S. Cl.
CPC ............. *H04W 64/006* (2013.01); *G01S 5/18* (2013.01); *H04L 67/04* (2013.01); *H04L 67/18* (2013.01);
(Continued)

(58) Field of Classification Search
CPC ....... H04W 4/02–4/027; H04W 64/00–64/006
(Continued)

(56) References Cited

U.S. PATENT DOCUMENTS 6,137,441 A * 10/2000 Dai ..................... G01S 5/12
                                                342/357.64
7,027,822 B1 * 4/2006 Hwang ............. G01S 5/0268
                                                455/404.2
(Continued)

OTHER PUBLICATIONS

Wenguang Mao et al. "High-precision acoustic motion tracking: demo", Oct. 3-7, 2016, MobiCom '16 Proceedings of the 22nd Annual International Conference on Mobile Computing and Networking, pp. 491-492.*

(Continued)

*Primary Examiner* — Allahyar Kasraian
(74) *Attorney, Agent, or Firm* — Robert A. Voigt, Jr.; Winstead, P.C.

(57) ABSTRACT

A method, system and computer program product for tracking a mobile device. A reference position of the mobile device and a frequency offset between the mobile device and another device are estimated. Samples are then fetched at various frequencies from the receivers. The fetched signals are mixed with a pseudo transmitted signal. A relative distance between the mobile device and the other device is computed based on a change in frequency of the mixed signal at a current location, a velocity of the mobile device and the estimated frequency offset. An absolute distance between the mobile device and the other device is determined using the reference position and the computed relative distance. A location of the mobile device is then determined based on the mobile device's velocity and the determined absolute difference.

33 Claims, 9 Drawing Sheets

(51) Int. Cl.
*H04L 29/08* (2006.01)
*G01S 5/18* (2006.01)
*H04W 4/80* (2018.01)
*H04L 29/06* (2006.01)
*H04W 88/02* (2009.01)

(52) U.S. Cl.
CPC ............. *H04L 67/22* (2013.01); *H04W 48/16* (2013.01); *H04L 67/38* (2013.01); *H04W 4/80* (2018.02); *H04W 88/02* (2013.01)

(58) Field of Classification Search
USPC ..... 455/456.1–457; 700/56–70, 85, 186, 302
See application file for complete search history.

(56) References Cited

U.S. PATENT DOCUMENTS

| | | | |
|---|---|---|---|
| 2002/0177450 A1 | 11/2002 | Vayanos | |
| 2004/0012566 A1 | 1/2004 | Bradski | |
| 2004/0172195 A1 | 9/2004 | Underbrink et al. | |
| 2007/0259690 A1* | 11/2007 | Julian | H04L 67/24 455/557 |
| 2012/0075957 A1 | 3/2012 | De Bruijn | |
| 2012/0283987 A1* | 11/2012 | Busking | G01S 13/82 702/159 |
| 2014/0018101 A1* | 1/2014 | Namba | G06Q 10/08 455/456.2 |
| 2014/0355389 A1* | 12/2014 | Reunamaki | G08C 23/02 367/197 |
| 2015/0351067 A1* | 12/2015 | Taylor, Jr. | G01S 11/08 455/456.1 |

OTHER PUBLICATIONS

Wenguang Mao et al. "CAT: high-precision acoustic motion tracking", Oct. 3-7, 2016, MobiCom '16 Proceedings of the 22nd Annual International Conference on Mobile Computing and Networking, pp. 69-81.*

International Search Report and Written Opinion of the International Searching Authority for International Application No. PCT/US16/64663 dated Feb. 21, 2017, pp. 1-11.

Zhang et al., "SwordFight: Enabling a New Class of Phone-to-Phone Action Games on Commodity Phones," MobiSys 2012, Jun. 25-29, 2012, Low Wood Bay, Lake District, UK, pp. 1-14.

Yun et al., "Turning a Mobile Device into a Mouse in the Air," MobiSys 2015, May 18-22, 2015, Florence, Italy, pp. 1-15.

Peng et al., "BeepBeep: A High Accuracy Acoustic Ranging System using COTS Mobile Devices," SenSys'07, Nov. 6-9, 2007, Sydney Australia, pp. 1-14.

International Preliminary Report on Patentability issued by the International Bureau of WIPO for International Application No. PCT/US2016/064663 dated Jun. 5, 2018, pp. 1-9.

* cited by examiner

ACCURATELY TRACKING A MOBILE DEVICE TO EFFECTIVELY ENABLE MOBILE DEVICE TO CONTROL ANOTHER DEVICE

TECHNICAL FIELD

The present invention relates generally to mobile devices, and more particularly to accurately tracking a mobile device (e.g., smartphone, smart watch) to effectively enable the mobile device to control another device (e.g., game console, virtual reality/augmented reality device, smart appliance, smart TV).

BACKGROUND

Users are currently demanding for a new way to interact and control devices, such as video game consoles, virtual reality (VR)/augmented reality (AR) devices and smart appliances. For example, interactive video games (i.e., the games played by movement) are popular across the world. However, many of the video game players are unsatisfied with the existing tracking technologies in the video games: (i) they often complain about their tracking accuracy, and (ii) the coarse-grained tracking accuracy has also limited the existing interactive games to only sports and dancing games, which require large movement, whereas, many gamers enjoy more fine-grained movement games, such as shooter games.

In addition, virtual reality (VR) and augmented reality (AR) are becoming increasingly popular. One of the major factors that impact its success and potential is the availability of an easy-to-use user interface. The current interfaces of VR/AR are rather constrained (e.g., relying on tapping, swiping, or voice recognition). This significantly limits its potential applications.

Moreover, smart appliances are becoming increasingly popular. For example, smart TVs offer a rich set of controls, and it is important for users to easily control smart TVs. More and more appliances will become smart and can let users control them remotely.

Since mobile devices, such as smartphones and smart watches, are becoming ubiquitous, they can potentially serve as universal controllers. In order to utilize a mobile device as an effective controller, its movement should be tracked very accurately, such as within a centimeter. While significant work has been done on localization and tracking, the existing technologies fall short in achieving: (i) high accuracy (e.g., mm accuracy), (ii) responsiveness (e.g., within tens of milliseconds), (iii) robustness under different environments, (iv) requiring little calibration, and (v) using existing hardware.

SUMMARY

In one embodiment of the present invention, a method for tracking a mobile device comprises estimating a reference position of the mobile device. The method further comprises computing a relative distance change between the mobile device and another device from the reference position of the mobile device. The method additionally comprises determining, by a processor, an absolute distance between the mobile device and the another device using the reference position and the computed relative distance change.

Other forms of the embodiment of the method described above are in a mobile device and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

As discussed below, the present invention provides a technique for allowing a user of a mobile device (e.g., smart phone) to control another device (e.g., video game console) by simply moving the mobile device. A unique feature of the present invention is that it uses existing hardware already available, while achieving high accuracy and ease of use. Specifically, the device to be controlled (e.g., a game console, a VR/AR headset, a smart appliance) is equipped with multiple speakers. The speakers emit sound, which is received by the mobile device. Based on the received sound, the movement of the mobile device is tracked using a new Frequency Modulated Continuous Waveform (FMCW) approach and also leveraging the Doppler shift of audio signals.

The Doppler effect is a known phenomenon where the frequency of a signal changes as a sender or receiver moves. By tracking the amount of frequency shift, one can estimate the speed of movement, based on which the distance between the mobile device and the device to be controlled as well as the location of the mobile device can be estimated.

The new FMCW approach of the present invention allows one to accurately estimate the propagation delay of the audio signals using "chirp" signals. The approach of the present invention advances the existing FMCW approaches in several significant ways, such as (i) supporting separate and unsynchronized senders and receivers, (ii) explicitly accounting for the impact of movement on the frequency shift in the mixed signal, whereas, existing schemes all assume nodes are static, and (iii) estimating a reference position, based on which the absolute subsequent position of the mobile device is derived in real time. Furthermore, an effective optimization framework is developed that incorporates both the Doppler shift and the FMCW estimation over multiple time intervals to achieve high tracking accuracy. Furthermore, the measurements from inertial measurement unit (IMU) sensors (e.g., accelerometers and gyroscopes) may be combined with the audio signals to improve the accuracy.

In the following description, various embodiments are described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

It is noted that the term "landmarks," as used herein, refer to the "senders" of signals (e.g., speakers) and "receivers" of signals (e.g., microphones).

Figure 1:
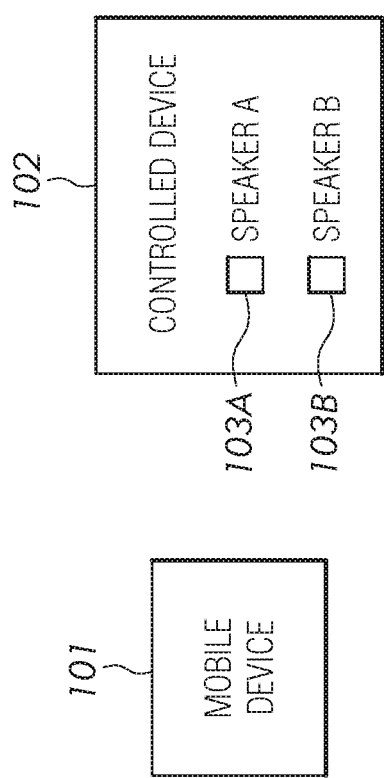
FIG. 1 illustrates a system configured in accordance with an embodiment of the present invention.

Referring now to the Figures in detail, FIG. 1 illustrates a system 100 configured in accordance with an embodiment of the present invention. Referring to FIG. 1, system 100 includes a mobile device 101 configured to control a device 102 ("controlled device") (e.g., game console, virtual reality/augmented reality device, smart appliance, smart TV).

Mobile device 101 may be any mobile computing device (e.g., Personal Digital Assistant (PDA), smartphone, mobile phone, navigation device, Internet appliance and the like) with a microphone to convert sound (e.g., such as audio signals from the speakers of controlled device 102) into an electrical signal. A more detailed description of the hardware configuration of one embodiment of mobile device 101 is provided below in connection with FIG. 2.

Controlled device 102 may be any electronic device that can be controlled by mobile device 101, where controlled device 102 contains two or more speakers 103A-103B (identified as "speaker A" and "speaker B," respectively, in FIG. 1). Speakers 103A-103B may collectively or individually be referred to as speakers 103 or speaker 103, respectively. While FIG. 1 illustrates two speakers 103A, 103B, controlled device 102 may contain any number of speakers 103. A more detailed description of the hardware configuration of controlled device 102 is provided below in connection with FIG. 3.

Figure 2:
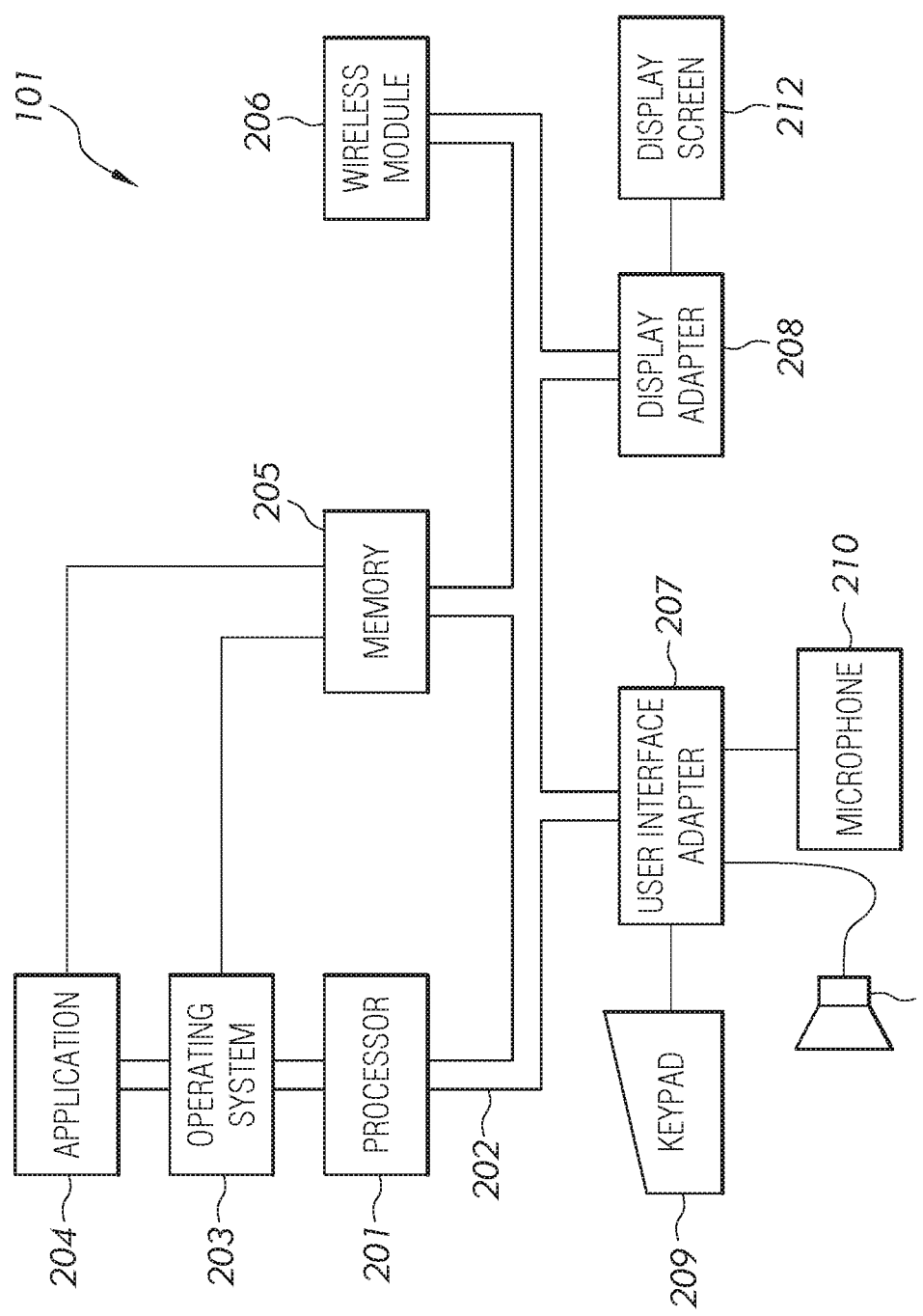
FIG. 2 illustrates a hardware configuration of a mobile device in accordance with an embodiment of the present invention.

Referring now to FIG. 2, FIG. 2 illustrates a hardware configuration of mobile device 101 (FIG. 1) which is representative of a hardware environment for practicing the present invention. Referring to FIG. 2, mobile device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for tracking mobile device 101 to effectively enable mobile device 101 to control controlled device 102 as discussed further below in connection with FIGS. 4A-4B, 5-7 and 8A-8B.

Mobile device 101 further includes a memory 205 connected to bus 202 that is configured to control the other functions of mobile device 101. Memory 205 is generally integrated as part of mobile device's 101 circuitry, but may, in some embodiments, include a removable memory, such as a removable disk memory, integrated circuit (IC) memory, a memory card, or the like. Processor 201 and memory 205 also implement the logic and store the settings, preferences and parameters for mobile device 101. It should be noted that software components including operating system 203 and application 204 may be loaded into memory 205, which may be mobile device's 101 main memory for execution.

Mobile device 101 additionally includes a wireless module 206 that interconnects bus 202 with an outside network thereby allowing mobile device 101 to communicate with other devices, such as controlled device 102 (FIG. 1). In one embodiment, wireless module 206 includes local circuitry configured to wirelessly send and receive short range signals, such as Bluetooth, infrared or Wi-Fi.

I/O devices may also be connected to mobile device 101 via a user interface adapter 207 and a display adapter 208. Keypad 209, microphone 210 and speaker 211 may all be interconnected to bus 202 through user interface adapter 207. Keypad 209 is configured as part of mobile device 101 for dialing telephone numbers and entering data. Mobile device 101 may have microphone 210 and speaker 211 for the user to speak and listen to callers. Additionally, mobile device 101 includes a display screen 212 connected to system bus 202 by display adapter 208. Display screen 212 may be configured to display messages and information about incoming calls or other features of mobile device 101 that use a graphic display. In this manner, a user is capable of inputting to mobile device 101 through keypad 209 or microphone 210 and receiving output from mobile device 101 via speaker 211 or display screen 212. Other input mechanisms may be used to input data to mobile device 101 that are not shown in FIG. 2, such as display screen 212 having touch-screen capability with the ability to utilize a virtual keyword. Mobile device 101 of FIG. 2 is not to be limited in scope to the elements depicted in FIG. 2 and may include fewer or additional elements than depicted in FIG. 2. For example, mobile device 101 may only include memory 205, processor 201 and microphone 210.

Figure 3:
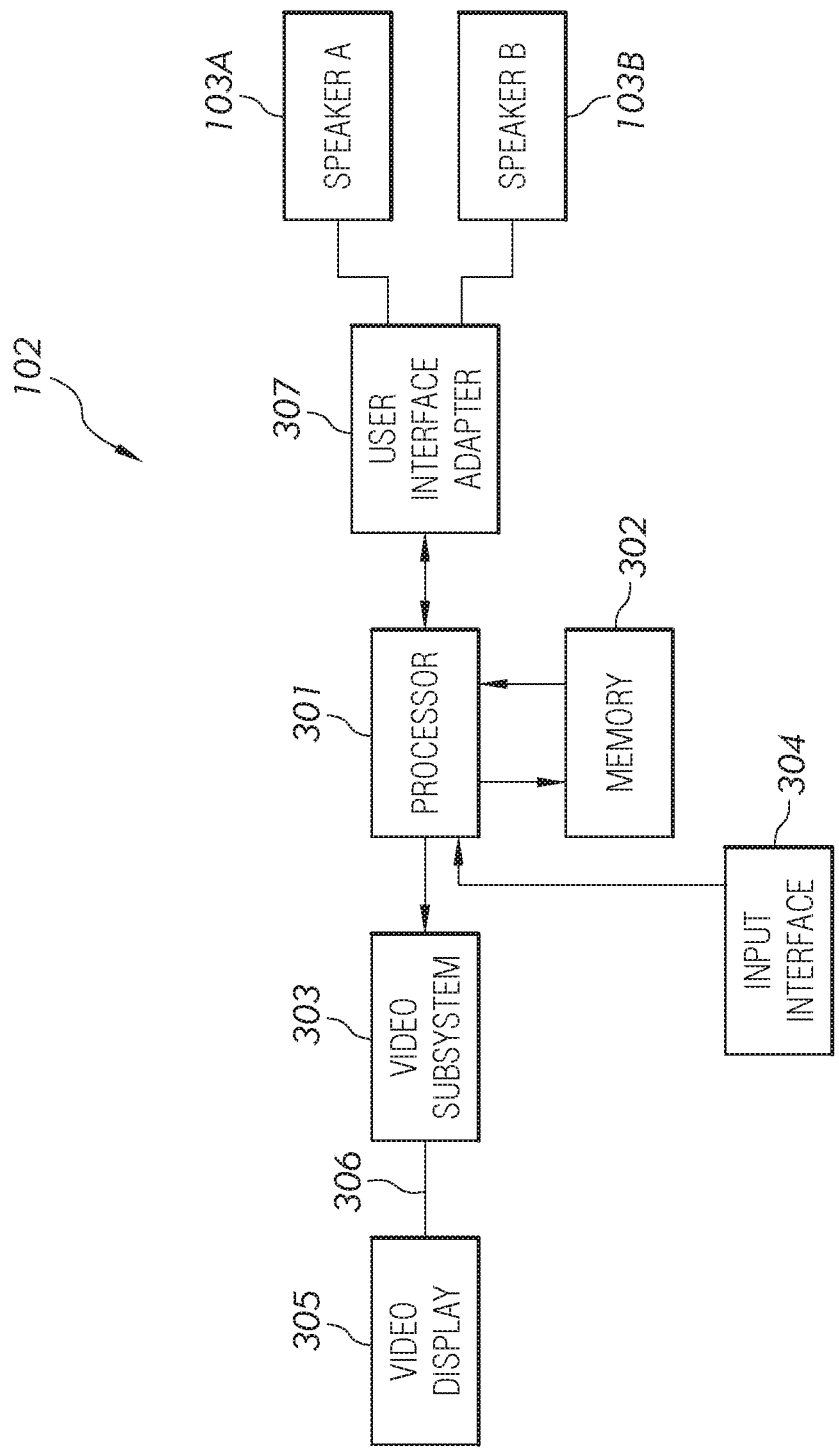
FIG. 3 illustrates a hardware configuration of a controlled device in accordance with an embodiment of the present invention.

Referring now to FIG. 3, FIG. 3 is a functional block diagram of an example of a controlled device 102 (FIG. 1), such as a game console apparatus. In this example, controlled device 102 includes one or more processors 301. Processor 301 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, electronic units, or a combination thereof.

Processor 301 is configured to store data received by one or more interfaces and process and store the data on a memory 302. Memory 302 can be implemented within processor 301 or external to processor 301. As used herein, the term memory refers to any type of long term, short term, volatile, nonvolatile, or other memory and is not to be limited to any particular type of memory or number of memories or type of media upon which memory is stored.

Processor 301 is also configured to communicate data and/or instructions to and/or from a video subsystem 303 and an input interface 304. Video subsystem 303 is configured to provide video and audio data to a video display 305 over a video connection 306. Video subsystem 303 receives various instructions from processor 301.

Input interface 304 is configured to receive signals from mobile device 101. In one embodiment, controlled device 102 can include one or more types of input devices including, for example, a joystick, a keyboard, a mouse, touchpad, toggle switches, track ball, scroll wheel, etc. In one aspect, the user input signals received by the input interface 304 can be forwarded to processor 301 as they are received. In other aspects, input interface 304 can process the received input and transform them into another format before forwarding the transformed inputs to the process. For example, the received inputs can be analog signals, the input interface can transform these to digital signals in a predetermined format.

Furthermore, I/O devices, such as speakers 103A, 103B, are connected to controlled device 102 via a user interface adapter 307. Speakers 103A, 103B are configured to generate an audio signal (audible or inaudible to humans) at various frequencies.

Controlled device 102 of FIG. 3 is not to be limited in scope to the elements depicted in FIG. 3 and may include fewer or additional elements than depicted in FIG. 3. For example, controlled device 102 may be any device that simply includes speakers 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, users are currently demanding for a new way to interact and control devices, such as video game consoles, virtual reality (VR)/augmented reality (AR) devices and smart appliances. For example, interactive video games (i.e., the games played by movement) are popular across the world. However, many of the video game players are unsatisfied with the existing tracking technologies in the video games: (i) they often complain about their tracking accuracy, and (ii) the coarse-grained tracking accuracy has also limited the existing interactive games to only sports and dancing games, which require large movement, whereas, many gamers enjoy more fine-grained movement games, such as shooter games. In addition, virtual reality (VR) and augmented reality (AR) are becoming increasingly popular. One of the major factors that impact its success and potential is the availability of an easy-to-use user interface. The current interfaces of VR/AR are rather constrained (e.g., relying on tapping, swiping, or voice recognition). This significantly limits its potential applications. Moreover, smart appliances are becoming increasingly popular. For example, smart TVs offer a rich set of controls, and it is important for users to easily control smart TVs. More and more appliances will become smart and can let users control them remotely. Since mobile devices, such as smartphones and smart watches, are becoming ubiquitous, they can potentially serve as universal controllers. In order to utilize a mobile device as an effective controller, its movement should be tracked very accurately, such as within a centimeter. While significant work has been done on localization and tracking, the existing technologies fall short in achieving: (i) high accuracy (e.g., mm accuracy), (ii) responsiveness (e.g., within tens of milliseconds), (iii) robustness under different environments, (iv) requiring little calibration, and (v) using existing hardware.

Figure 4A:
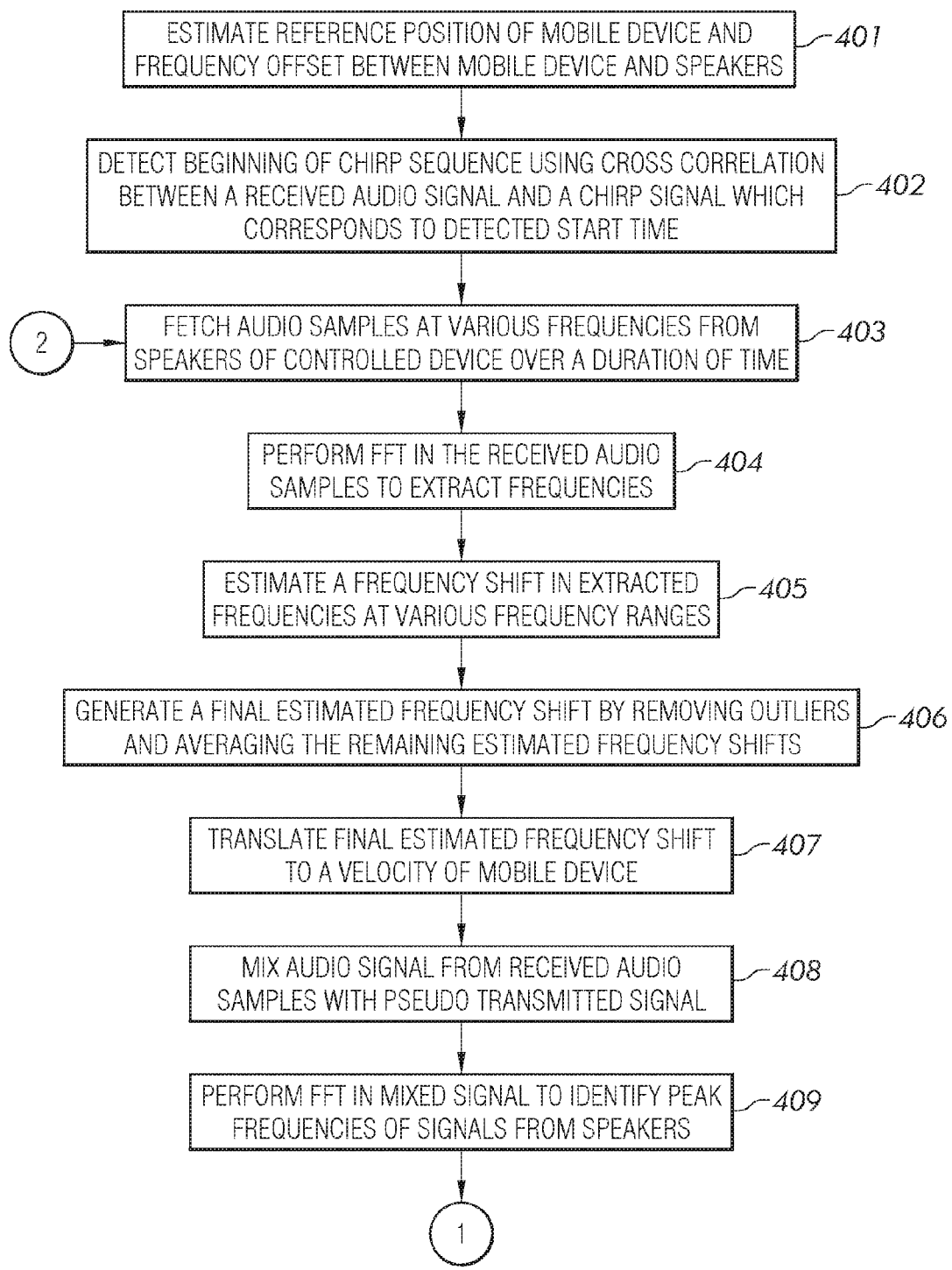
FIGS. 4A-4B are a flowchart of a method for tracking the movement of the mobile device very accurately in accordance with an embodiment of the present invention.
Figure 4B:
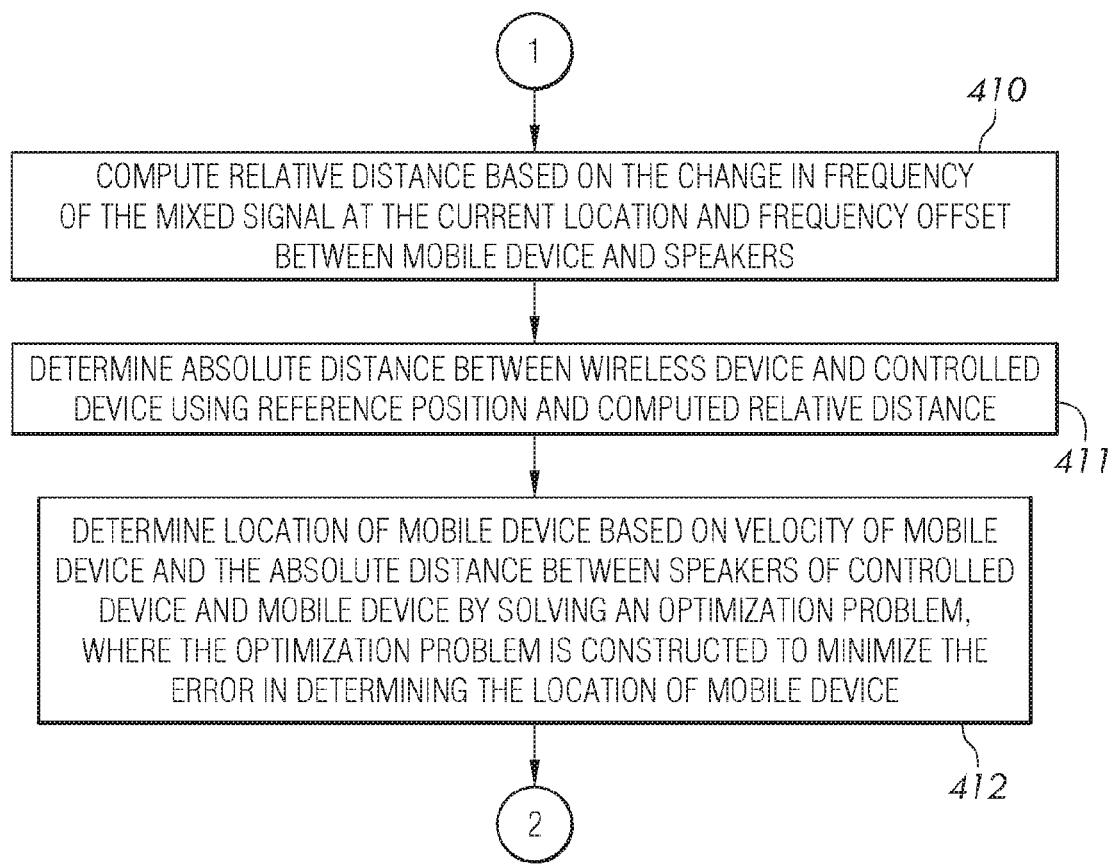
Figure 5:
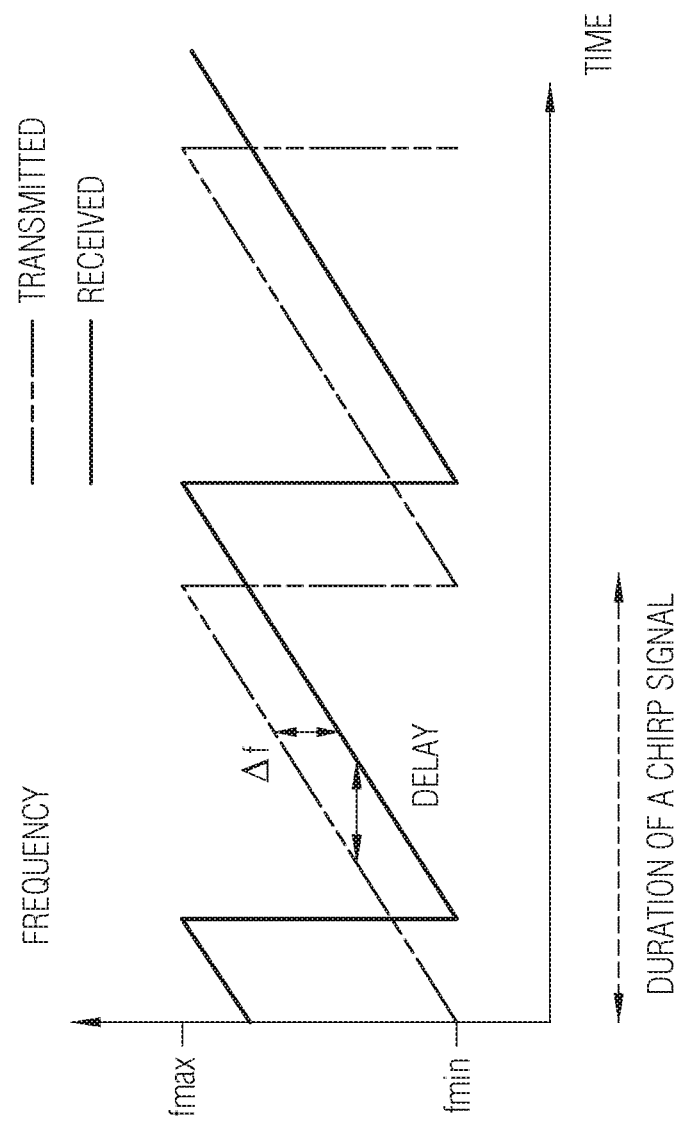
FIG. 5 shows a chirp signal, whose frequency increases linearly from $f_{min}$ to $f_{max}$ in accordance with an embodiment of the present invention.
Figure 6:
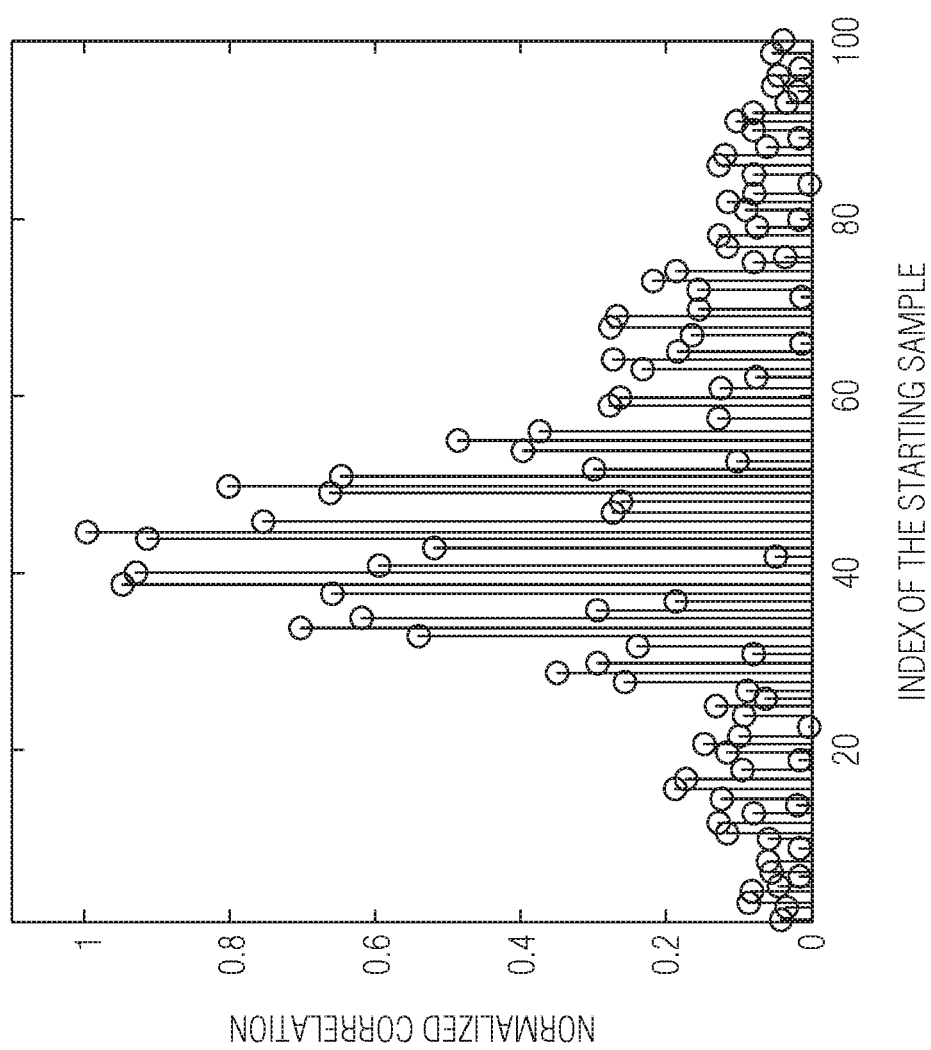
FIG. 6 shows an example cross correlation between the received and transmitted chirp signals in accordance with an embodiment of the present invention.
Figure 7:
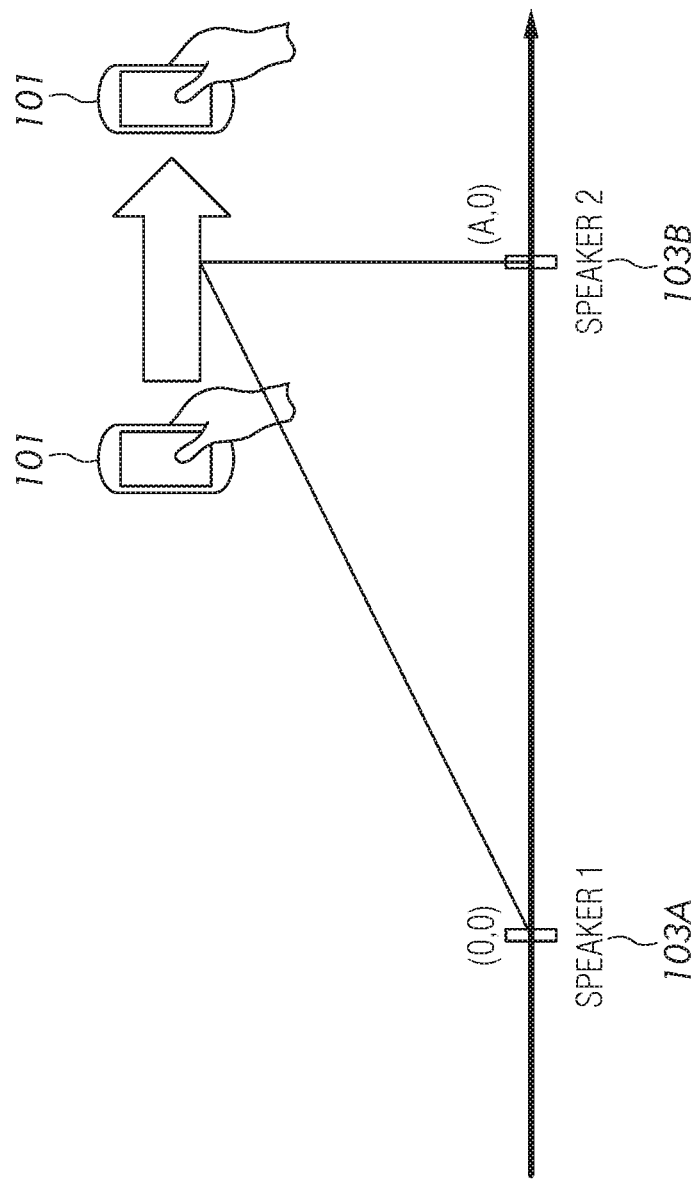
FIG. 7 illustrates estimating the reference position in accordance with an embodiment of the present invention.
Figure 8A:
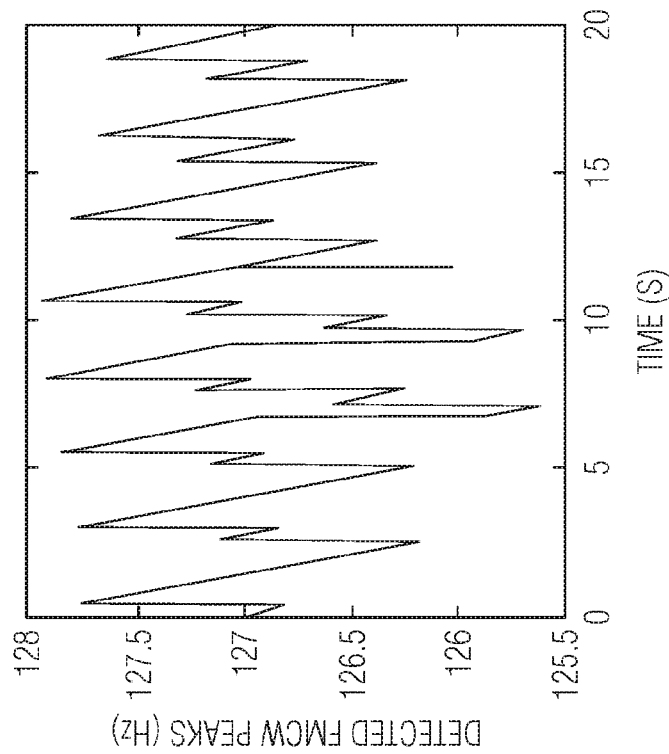
FIGS. 8A-8B are graphs of the detected FMCW peaks (Hz) versus time in accordance with an embodiment of the present invention.
Figure 8B:
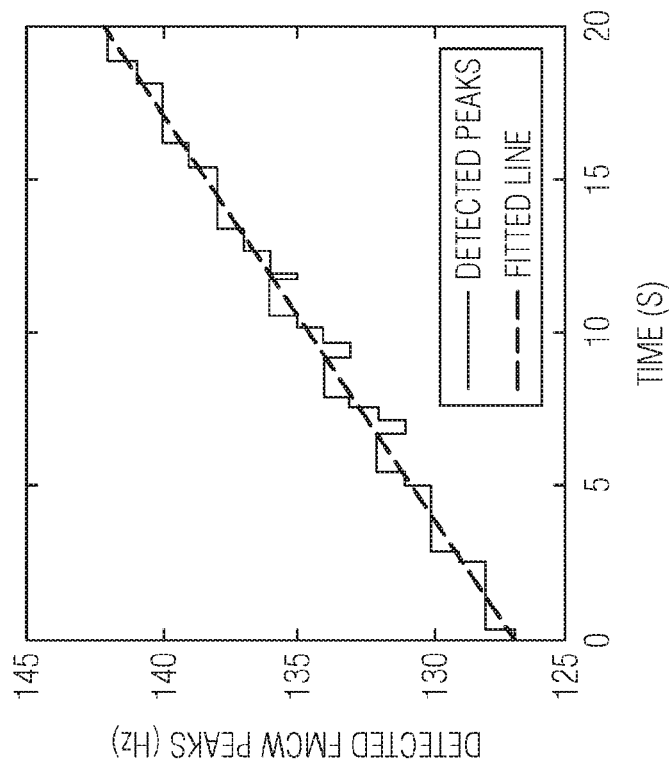

The principles of the present invention provide a means for enabling mobile device 101 (FIG. 1) to effectively control controlled device 102 (FIG. 2) by tracking the movement of mobile device 101 very accurately (e.g., within a centimeter) without requiring significant calibration and utilizing existing hardware as discussed below in association with FIGS. 4A-4B, 5-7 and 8A-8B. FIGS. 4A-4B are a flowchart of a method for tracking the movement of mobile device 101 very accurately. FIG. 5 shows a chirp signal, whose frequency increases linearly from $f_{min}$ to $f_{max}$. FIG. 6 shows an example cross correlation between the received and transmitted chirp signals. FIG. 7 illustrates estimating the reference position. FIGS. 8A-8B are graphs of the detected FMCW peaks (Hz) versus time.

As stated above, FIGS. 4A-4B are a flowchart of a method 400 for tracking the movement of mobile device (FIG. 1) very accurately in accordance with an embodiment of the present invention.

Referring to FIG. 4A, in conjunction with FIGS. 1-3, in step 401, mobile device 101 estimates the reference position of mobile device 101. Furthermore, in step 401, mobile device 101 estimates the frequency offset between mobile device 101 and speakers 103. In one embodiment, such estimates occur during a "calibration" phase which may only need to occur a single time.

In step 402, mobile device 101 detects the beginning of a "chirp" sequence using cross correlation between an audio signal and a chirp signal both received from speaker(s) 103 which corresponds to the detected start time.

In step 403, mobile device 101 fetches audio samples of the audio signals at various frequencies from speakers 103 of controlled device 102 over a duration of time from the detected start time. That is, mobile device 101 fetches audio samples of the audio signals at various frequencies from speakers 103 of controlled device 102 over a duration of time in response to detecting the "start time" of step 402.

In step 404, mobile device 101 performs a fast Fourier transform (FFT) in the received audio samples to extract frequencies.

In step 405, mobile device 101 estimates the frequency shift in the extracted frequencies at various frequency ranges.

In step 406, mobile device 101 generates a final estimated frequency shift by removing outliers and averaging the remaining estimated frequency shifts In step 407, mobile device 101 translates the final estimated frequency shift to a velocity of mobile device 101.

It is noted that steps 401-407 may be performed independently and/or concurrently from steps 408-412 discussed below.

In step 408, mobile device 101 mixes an audio signal from the received audio samples with a "pseudo" transmitted signal.

In step 409, mobile device 101 performs a fast Fourier transform (FFT) in the mixed signal to identify the peak frequencies of the signals from speakers 103.

Alternatively, the peak frequencies may be identified by estimating the auto-correlation matrix of the mixed signal v as follows $R=V^H V$, where V is the Toeplitz matrix of v and its i-th column is given by:
$[v_{M+1-i}, v_{M+2-i}, \ldots, v_{N+1-i}]^T$ (i∈[1,M]) and $V^H$ is the transpose of the matrix V. Here N is the length of the mixed signal, and M is the order of the auto-correlation matrix (i.e., R has the size M×M) Then the eigenvalue decomposition is applied to R. The eigenvectors obtained from the eigenvalue decomposition to the auto-correlation matrix of the mixed signal are sorted in descending order of the corresponding eigenvalues' magnitudes. The space spanned by the first $M_s$ eigenvectors is called the "signal space," and the space spanned by the other eigenvectors is called the "noise space." Let $R_N$ denote the noise space matrix, and its i-th column is the i-th eigenvector for the noise space.

Let s(f) denote the steering vector which is defined as:

$$[1, e^{j2\pi f t_s}, \ldots, e^{j2\pi f(M-1)t_s}]^T.$$

As a result, the pseudo-spectrum of the mixed signal is defined as:

$$p(f) = \frac{1}{s(f)^H R_N R_N^H s(f)}.$$

Once can find $f_i$ by locating the peaks in the pseudo-spectrum. Alternatively, one can directly compute the root.

Referring now to FIG. 4B, in conjunction with FIGS. 1-3, in step 410, mobile device 101 computes the relative distance between speakers 103 and mobile device 101 based on the change in frequency of the mixed signal at the current location and the frequency offset between mobile device 101 and speakers 103.

In step 411, mobile device 101 determines the absolute distance between mobile device 101 and controlled device 102 using the reference position and the computed relative distance.

In step 412, mobile device 101 determines the location of mobile device 101 based on the velocity of mobile device 101 and the absolute distance between speakers 103 of controlled device 102 and mobile device 101 by solving an optimization problem, where the optimization problem is constructed to minimize the error in determining the location of mobile device 101. In one embodiment, mobile device 101 constructs an optimization problem and calls a nonlinear optimization library to solve it. Mobile device 101 then fetches audio samples of the audio signals at various frequencies from speakers 103A, 103B of controlled device 102 over the next duration of time in step 403.

A detailed discussion regarding steps 401-412 is provided below.

The Doppler effect is a known phenomenon where the frequency of a signal changes as a sender or receiver moves. Without loss of generality, the case of when the receiver moves while the sender remains static is considered. The frequency changes with the velocity as follows:

$$v = \frac{F^s}{F}c \quad (1)$$

where F denotes the original frequency of the signal, $F^s$ denotes the amount of frequency shift, v and c denote the receiver's speed towards the sender and the propagation speed of the wave, respectively. Therefore, by measuring the amount of frequency shift $F^s$, one can estimate the velocity of the movement with respect to the transmitter, which can further be used to get distance and location.

In one embodiment, the following approach is used to estimate the Doppler shift. Each speaker 103A, 103B continuously emits sine waves (e.g., inaudible sine waves) at several frequencies. Different speakers 103A, 103B use different frequencies to distinguish from each other. The receiver (e.g., mobile device 101) samples the audio signals at a sampling rate (e.g., 44.1 KHz standard sampling rate), applies the Hanning window to avoid frequency leakage, and then uses Short-term Fourier Transform (STFT) to extract frequencies. In one embodiment, 1764 samples were used to compute STFT. This corresponds to the audio samples in 40 ms. A peak frequency may then be obtained, which is then used (or a function of several peak frequencies) to compute the frequency shift. In order to enhance the accuracy, each speaker 103A, 103B emits sine waves at different frequency ranges and the receiver (i.e., mobile device 101) estimates the frequency shift at each of the frequency ranges and combine these estimates by removing outliers and averaging the remaining estimates. This final estimated frequency shift is then used to compute the velocity based on Equation 1, and integrated over time to get the current distance from each speaker 103A, 103B.

The principles of the present invention provide many major innovations over tradition FMCW which is used to determine the absolute distance between controlled device 102 and mobile device 101 as discussed below. A brief discussion regarding traditional FMCW is first provided followed by a discussion regarding the modified FMCW utilized by the present invention.

Instead of sending a sharp pulse signal using a large bandwidth, traditional FMCW lets each speaker transmit a chirp signal every interval. FIG. 5 shows a chirp signal, whose frequency increases linearly from $f_{min}$ to $f_{max}$ in accordance with an embodiment of the present invention. The principles of the present invention uses $f_{max} - f_{min} = 2.5$ KHz and 40 ms as an interval.

The frequency within each sweep is $$f = f_{min} + \frac{\beta t}{T},$$

where $\beta$ is the bandwidth, T is the sweep time (close to one time interval). The frequency over time is integrated to get the corresponding phase: $u(t)=2\pi(f_{min}t+B)$. Therefore, the transmitted signal during the n-th sweep is $$v_t(t') = \cos\left(2\pi f_{min} t' + \frac{\pi B t'^2}{T}\right),$$

where $t'=t-nT$.

Consider a chirp signal propagates over the medium and arrives at the receiver (i.e., mobile device 101) after a delay $t_d$. The received signal is attenuated and delayed in time, and becomes $$\alpha \cos\left(2\pi f_{min}(t' - t_d) + \frac{\pi B(t' - t_d)^2}{T}\right),$$

where $\alpha$ is the attenuation factor.

The receiver (i.e., mobile device 101) mixes (i.e., multiplies) the received signal with the transmitted signal. That is, $v_m(t)=v_r(t)v_t(t)$. $v_m(t)$ is a product of two cosine's. By using cos A cos B=(cos(A-B)+cos(A+B))/2 and filtering out the high frequencing A+B component, which has frequency of the order $2f_{min}$, $v_m(t)$ becomes:

$$v_m(t) = \alpha \cos\left(2\pi f_{min} t_d + \frac{\pi B(2t' t_d - t_d^2)}{T}\right) \quad (2)$$

Suppose the mobile device 101 is a distance R from the speaker 103 initially and moves at a speed of v. Then $$t_d = \frac{R + vt'}{c}.$$

Plugging $t_d$ into Equation (3) gives us $$\alpha \cos\left(2\pi f_{min} \frac{R + vt'}{c} + \left(\frac{2\pi B t(R + vt')}{Tc} - \frac{\pi B(R + vt')^2}{c^2 T}\right)\right).$$

If STFT is applied to the frequency of $v_m$, the constant phase term will be ignored and the terms quadratic with respect to $(t')^2$ will be too small and can also be ignored. The peak frequency, denoted as $f_p$, becomes $$f_p = \frac{1}{2\pi} \frac{\delta Phase}{\delta t} = \frac{BR}{cT} + \frac{f_{min}v}{c} + \frac{2Bvt'}{Tc}.$$

When v is close to 0, the frequency peaks at $$\frac{BR}{cT}.$$

Therefore, one can use $f_p$ to derive the distance R as:

$$R = \frac{f_p cT}{B} \tag{3}$$

The tracking system of the present invention modifies the traditional FMCW. In particular, the system of the present invention has four major innovations over the traditional FMCW. First, the existing FMCW analysis results and systems all assume co-located sender and receiver. However, the approach of the present invention supports separate and un-synchronized senders and receivers. Second, the existing FMCW based systems assume the receiver is static. Since movement is common in various tracking scenarios, the impact of movement on the frequency shift is taken into account. Third, applying FMCW to separate senders and receivers only yields relative distance. However, tracking requires absolute distance. As a result, the approach of the present invention estimates a reference position and then uses the distance change with respect to the reference position to derive the current absolute position of mobile device 101. Fourth, the principles of the present invention take into account for the impact of frequency offset between the sender and receiver to obtain a more accurate distance estimation. Each of these four aspects is elaborated below.

In connection with supporting unsynchronized senders and receivers, the transmitter (i.e., controlled device 102) (e.g., speakers 103A, 103B on the game console or VR headset) and the receiver (i.e., mobile device 101) (e.g., microphones 210 on the smartphone) are separated, and their clocks are not synchronized. Precise synchronization between speakers 103A, 103B and microphone(s) 210 is challenging. Even a small synchronization error of 0.1 ms will lead to 0.1 ms×c=0.1×346 m/s≈3.5 cm error, were c is the propagation speed of sound and around 346 m/s.

The lack of synchronization is addressed below where the difference in clock rates between mobile device 101 and speakers 103 of controlled device 102 is estimated. First, upon receiving a signal, mobile device 101 uses cross correlation between the received signal and the original "chirp" signal emanated from speaker 103A, 103B to detect the arrival time of the first chirp signal. This arrival time detection is approximate since the cross correlation usually shows multiple peaks. FIG. 6 shows an example cross correlation between the received and transmitted chirp signals in accordance with an embodiment of the present invention. There are several peaks of similar magnitudes. Moreover, the highest peak may not come from the shortest path due to multipath propagation.

To avoid the need to precisely determine the arrival time, the notion of a pseudo transmitted signal is introduced. Specifically, the received signal (starting from the previously detected arrival time, which may not be precise) is mixed with a pseudo transmitted signal. Let $t_o$ denote the difference between the pseudo transmission time and actual transmission time of the first chirp signal. The value of $t_o$ is not known. Based on the pseudo transmission time, the receiver can construct a pseudo transmitted signal, which starts at that time. By mixing (i.e., multiplying) the received signals with the pseudo transmitted signals, and applying the similar procedure as mentioned above, one can find the following peak frequency:

$$f_n^p = \frac{B(R_n - ct_0)}{cT} \tag{4}$$

in the mixed signals, where c is the propagation speed of the audio signal, T is the chirp duration, B is the bandwidth of the chirp signal, which is equal to $f_{max}-f_{min}$, $R_n$ is the distance between the transmitter and the receiver during the n-th sampling interval. Thus, $$f_n^p - f_1^p = \frac{B(R_n - R_1)}{cT}. \tag{5}$$

If the distance between the transmitter and the receiver's reference position, denoted as $R_1$, is known, Rn can be determined based on:

$$R_n = (f_n^p - f_1^p)\frac{cT}{B} + R_1. \tag{6}$$

With respect to the impact of movement, the previous derivation assumes that the receiver is static. However, in the tracking system of the present invention, the receiver may move. The non-negligible velocity will lead to an additional shift to the peak frequency of the mixed signals. In this case, the peak frequency is at:

$$f_n^p = \frac{B(R_n - ct_0)}{cT} + \frac{f_{min}v_n}{c} + \frac{2Bv_n t'}{Tc} \tag{7}$$

where $v_n$ is the velocity of the receiver with respect to the transmitter in the n-th sampling interval. This relationship suggests the frequency changes during T. The average frequency during T is computed by letting t'=T/2. Therefore, the average $f_n^p$ becomes as follows:

$$f_n^p = \frac{B(R_n - ct_0)}{cT} + \frac{f_{min}v_n}{c} + \frac{Bv_n}{c} \tag{8}$$

Therefore, $R_n$ can be estimated by measuring the peak frequencies during in the first and n-th chirp sequence (i.e., $f_n^p$ and $f_1^p$), the velocity during the n-th chirp sequence ($v_n$) estimated from the Doppler shift, and reference distance (i.e., $R_1$) as follows:

$$R_n = \left(f_n^p - \frac{f_{min}v_n}{c} - \frac{Bv_n}{c} - f_1^p\right)\frac{cT}{B} + R_1. \tag{9}$$

This assumes the receiver is static during the transmission of the first chirp sequence, which is reasonable. $V_n$ can be estimated based on the Doppler shift as described above. Next, a discussion regarding estimating the reference position $R_1$ is provided below.

To obtain the current absolute position, the reference position is first estimated and then the reference position and the relative distance from the reference position are used to derive the absolute distance between mobile device 101 and each speaker 103A, 103B in real time. Then, as discussed further below, an optimization framework is used to localize the current position based on the distance and velocity estimations.

One calibration scheme to quickly obtain the reference position is discussed below. Consider the case where there are two speakers. Without loss of generality, let us assume that the two speakers 103A, 103B are at (0,0) and (A,0), respectively.

A discussion regarding estimating the reference point of mobile device 101 is now provided below.

In the embodiment where there are two speakers 103, the reference position can be estimated by detecting a time when a Doppler shift changes its sign as the user moves mobile device 101 back and forth across speakers 103 and, at the detected time, computing the position based on the separation between speakers 103 and the relative distance between mobile device 101 and each speaker 103 as discussed below in connection with FIG. 7. FIG. 7 illustrates estimating the reference position in accordance with an embodiment of the present invention.

As illustrated in FIG. 7, the user moves mobile device 101 around the reference position back and forth to swipe across the speaker 103A, 103B that it is in line with. Initially, as mobile device 101 comes closer to speaker 103A, 103B, the Doppler shift is positive. As mobile device 101 passes speaker 103A, 103B and moves away from it, the Doppler shift changes to negative. The time when the Doppler shift changes its sign is detected. The FMCW may then be applied to estimate the relative distance to the two speakers 103A, 103B from mobile device 101, denoted as ΔD, by having the two speakers 103A, 103B transmit at the same time and having the receiver (i.e., mobile device 101) measure the frequency shift from each speaker 103A, 103B. Then, one can compute the relative distance from the two speakers 103A, 103B to mobile device 101 based on the difference between the peak frequencies from the speakers 103A, 103B according to Equation (8). In particular, $$\Delta D = R_2 - R_1 = \frac{cT\Delta f_{2,1}}{B} - T\Delta v_{2,1} - \frac{Tf_{min}\Delta v_{2,1}}{B} \quad (10)$$

where $\Delta f_{2,1}^P$ denotes the difference between the peak frequencies from the first and second speakers 103A, 103B and $\Delta v_{2,1}$ denotes the difference between the velocities with respect to the first and second speakers 103A, 103B estimated based on the Doppler shift.

Once ΔD is obtained, the location of mobile device 101, denoted as (x, y), can be determined as follows. As shown in FIG. 7, it is clear that x=A. Moreover, according to the property of right triangle, $y^2+A^2=(y+\Delta D)^2$. There is only one unknown: y in this equation, so y can be solved.

In the embodiment where are three or more speakers 103, any position can serve as a reference point. In one embodiment, the reference location may be obtained as follows: (1) from each speaker 103, the fetched audio signals are mixed with the transmitted signals; (2) the peak frequencies in the mixed signals are extracted; (3) based on the peak frequencies, one can estimate the relative distance to speaker 1 versus speaker 2 versus speaker 3, etc.; and (4) derive the reference location based on these relative distances.

The reference position, denoted as (x, y), can be solved based on the relative difference between each pair of speakers 103. Specifically, consider the three speakers located at (x1, y1), (x2, y2), and (x3, y3). The position (x, y) is derived by minimizing the following objective, which involves 3 unknowns and is easy to solve:

$$\min: \left|\left(\sqrt{(x-x_1)^2 + (y-y_1)^2} - \sqrt{(x-x_2)^2 + (y-y_2)^2}\right)^2 - \Delta D_{12}^2\right| + \quad (11)$$
$$\left|\left(\sqrt{(x-x_1)^2 + (y-y_1)^2} - \sqrt{(x-x_3)^2 + (y-y_3)^2}\right)^2 - \Delta D_{13}^2\right| +$$
$$\left|\left(\sqrt{(x-x_2)^2 + (y-y_2)^2} - \sqrt{(x-x_3)^2 + (y-y_3)^2}\right)^2 - \Delta D_{23}^2\right|$$

With respect to frequency offset, due to imperfect clocks, the sampling frequencies at the transmitter (i.e., controlled device 102) and receiver (i.e., mobile device 101) are not exactly the same. The frequency offset makes the sender and receiver have different $T_{sweep}$ which introduces an error in estimating the peak frequency. For example, consider the transmitter's frequency is 44100 samples/second and the receiver's frequency is 44101 samples/second. The last sample will be considered as being received at the (1+1/44100)-th second by the receiver. This introduces an extra delay of 1/44100 second at the receiver. As propagation delay, this extra delay will also be captured by FMCW and cause the peak frequency of the mixed signal to shift.

To estimate the frequency offset, a short calibration phase is introduced at the beginning. The receiver's location is corrected during the calibration. Without a frequency offset, the peak frequency should remain fixed. The frequency offset will introduce a steady shift in the peak frequency over time. The frequency offset can be estimated by plotting the peak frequency over time as shown in FIGS. 8A-8B. FIGS. 8A-8B are graphs of the detected FMCW peaks (Hz) versus time in accordance with an embodiment of the present invention.

The least square is the used to fit a line to the measurement data as shown in FIG. 8A. The slope of the line, denoted as k, captures how fast the frequency changes over time due to the frequency offset. Given the estimated slope, the raw measurements are post-processed as follows:

$$F_{recv}^{adjusted} = F_{recv}^{raw} - k\Delta T \quad (12)$$

where $F_{recv}^{adjusted}$ and $F_{recv}^{raw}$ are the adjusted and raw received frequencies, respectively, ΔT is the time duration and k is the slope. FIG. 8B shows $F_{recv}^{adjusted}$ is stable over time after the frequency offset compensation.

Therefore, $f_n^P - f_1^P = F_{recv,n}^{adjusted} - F_{recv,1}^{adjusted} = F_{recv,n}^{raw} - knT - F_{recv,1}^{raw}$ is used in Equation (9) to derive $R_n$, where n is the number of intervals and T is the sweep duration.

As discussed above, in one embodiment, mobile device 101 constructs an optimization problem and calls a non-linear optimization library to solve it. A discussion regarding such an optimization framework is provided below.

In one embodiment, the optimization framework of the present invention combines the Doppler shift and FMCW measurements for tracking. Specifically, $$\min: \sum_{i \in [k-n+1...k]} \sum_j \alpha(|z_i - c_j| - |z_0 - c_j| - d_{FMCW}^{i,j})^2 + \quad (13)$$
$$\sum_{i \in [k-n+2...k]} \sum_j \beta(|z_i - c_j| - |z_{i-1} - c_j| - v_{doppler}^{i,j} T)^2$$

where k is the current time interval, n is the number of time intervals used in the optimization, $z_i$ denotes the position of the mobile device's node at the i-th time interval, $z_0$ denotes the mobile device's reference position, $c_j$ denotes the position of the j-th speaker, $d_{FMCW}^{i,j}$ denotes the distance change from the reference location with respect to the j-th speaker during the i-th interval, $v_{doppler}^{i,j}$ denotes the velocity with respect to the j-th speaker during the i-th interval, T is the interval duration, and α and β are the relative weights of the distance measurement from FMCW and Doppler measurements.

The only unknowns in the optimization are the mobile device's 101 position over time (i.e., $z_i$). The speakers' coordinates $c_j$ are obtained in advance by measuring their pairwise distance based on the Doppler shift. Then the coordinates are established based on the speakers' 103 locations. and $d_{FMCW}^{i,j}$ and $v_{doppler}^{i,j}$ are derived from the FMCW and Doppler shift measurements, respectively.

Essentially, the objective reflects the goal of finding a solution $z_i$ that best fits the FMCW and Doppler measurements. The first term captures the distance estimated based on the coordinates that should match the relative distance estimated based on the FMCW, and the second term captures the distance traveled over an interval that should match with the distance computed based on the velocity. The objective consists of terms from multiple intervals to improve the accuracy. The formation is general, and can support 2-D or 3-D coordinates. $z_i$ and $c_j$ are both vectors, whose sizes are determined by the number of dimensions.

In one embodiment, inertial measurement unit (IMU) sensors may be leveraged along with the audio signals to improve the accuracy.

With respect to synchronization with IMU sensors, in order to use motion sensors together with audio signals for tracking, all the measurements should have consistent timestamps. While all the measurements are collected by the same mobile device 101, they may be misaligned. When the audio samples arrive at the receiver (i.e., mobile device 101), they may experience non-negligible processing delays before reaching the tracking application of the present invention, which timestamps the audio samples. Therefore, the processing delay should be subtracted so that the timestamps for the audio samples are consistent with IMU timestamps.

In one embodiment, the first few audio and IMU samples are post-processed to synchronize them. The user usually starts by holding mobile device 101 statically and then starts moving. There is a sudden change of movement, which will cause a sudden change in both audio and IMU timeseries at the same time. Therefore, one can use the sudden change to synchronize these timeseries. Specifically, the estimated velocity timeseries is gradually shifted with respect to the accelerometer timeseries, and the shift that maximizes the correlation is identified. Sharp changes are preferred for synchronization since the time of sharp changes may not be accurately detected. Since audio signals arrive periodically, the shift can be estimated once at the beginning which can be used to align the entire audio timeseries.

With respect to using IMU data, an accelerometer is cheap in terms of hardware cost, processing overhead, and battery consumption. However, it is known for its inaccuracy especially over time since estimating distance requires double integration of acceleration with time. The error quickly accumulates. To limit error accumulation, the initial velocity is estimated and then the acceleration is integrated over only a relatively short time (e.g., 360 ms) to get the distance traveled.

Moreover, the gyroscope may be used to measure the rotation and to translate the accelerometer readings to the accelerations in a consistent direction. In addition, the coordinates used by IMU may be different from the one defined by speakers 103. In one embodiment, a calibration phase is used to convert the IMU coordinate to the speakers' 103 coordinates by comparing the distance traveled estimated by the accelerometer and the distance (from speakers 103) estimated from the FMCW of the present invention.

In one embodiment, additional terms to the optimization objective and a new optimization variable to incorporate the error with respect to the IMU sensors are added to the optimization framework. Equation (14), shown below, shows the final objective.

$$\min: \sum_{i \in [k-n+1...k]} \sum_j \alpha(|z_i - c_j| - |z_0 - c_j| - d_{FMCW}^{i,j})^2 + \quad (14)$$
$$\sum_{i \in [k-n+2...k]} \sum_j \beta(|z_i - c_j| - |z_{i-1} - c_j| - v_{doppler}^{i,j} T)^2 +$$
$$\sigma(z_k - z_{k-n+1} - v_{k-n+1}^{init} t - d_{k-n+1,k}^{IMU})^2 +$$
$$\gamma(v_{k-n+1}^{init} + 1/2 * \Delta v_{k-n+1}^{IMU} - v_{doppler}^{k-n+1})^2$$

The first two terms are the same as above. Let k denote the current interval. The third term reflects the difference between the distance traveled during the past n−1 intervals estimated based on the mobile device's 101 coordinate versus the distance estimated from the initial velocity $v_{k-n+1}^{init}$ and acceleration, where $v_{k-n+1}^{init}$ is the new optimization variable and represents the initial velocity at the (k−n+1)-th interval. $d_{k-n+1,k}^{IMU}$ is the displacement from the start of (k−n+1)-th interval to the start of k-th interval, which is calculated based on IMU sensor readings assuming the initial velocity is zero. The fourth term reflects the difference between the average velocity (in the (k−n+1)-th interval) estimated based on the acceleration versus based on the Doppler shift, where $v_{doppler}^{i}$ is the velocity in the i-th interval estimated based on the Doppler shift and is a vector, and $\Delta v_{k-n+1}^{IMU}$ captures the velocity change in the (k−n+1)-th interval, which is calculated by acceleration from IMU readings. σ and γ are the relative weights of these two new terms.

In one embodiment, the optimization framework may also incorporate the mobility of the user (e.g., movement, direction and speed of the mobile device of the user) to further improve accuracy (i.e., to further improve the accuracy in determining the location of the mobile device).

A major challenge in distance estimation is synchronization between the sender's and receiver's clocks. Commercial approaches to achieve such distance estimation is by having a sender/receiver send signals to each other, however, such distance estimation is not accurate due to the unpredictable network delay. By utilizing the principles of the present invention, the sender/receive do not need to send signals to each other. Instead, the absolute distance is computed based on the reference position and the distance change from the reference position. Such a process is more accurate with no network overhead.

Furthermore, while the present invention has been discussed in connection with using an audio signal for tracking, the principles of the present invention may utilize any type of signal, even signals having frequencies outside the audio frequency range of roughly 20 to 20,000 Hz, such as radio frequencies.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for tracking a mobile device, the method comprising:
   estimating a reference position of said mobile device;
   fetching audio samples of audio signals at various frequencies from speakers over a duration of time;
   performing a fast Fourier transform in said fetched samples to extract frequencies;
   estimating a frequency shift in said extracted frequencies at one or more frequency ranges;
   translating said estimated frequency shift to a velocity of said mobile device;
   determining, by a processor, an absolute distance between said mobile device and another device using said reference position and a relative distance change between said mobile device and said another device;
   determining a location of said mobile device based on said velocity of said mobile device and said absolute distance between said mobile device and said another device;
   tracking said mobile device using said determined location of said mobile device; and
   controlling said another device by tracking said mobile device.

2. The method as recited in claim 1 further comprising:
   mixing signal from said fetched samples with a pseudo transmitted signal.

3. The method as recited in claim 2 further comprising:
   computing said relative distance change between said another device and said mobile device at two locations based on a change in frequencies of said mixed signal at said two locations.

4. The method as recited in claim 2 further comprising:
   estimating a frequency offset between said mobile device and said another device; and
   computing said relative distance change between said mobile device and said another device based on a change in frequency of said mixed signal at a current location, a velocity of said mobile device and said frequency offset between said mobile device and said another device.

5. The method as recited in claim 2 further comprising:
   detecting a time when a Doppler shift changes its sign as a user moves said mobile device back and forth across landmarks on said another device; and
   estimating said reference position of said mobile device at said detected time based on a separation between different landmarks of said another device and a difference in relative distances between different landmarks of said another device and said mobile device.

6. The method as recited in claim 5 further comprising:
   estimating said difference in relative distances between different landmarks of said another device and said mobile device by performing a fast Fourier transform of said mixed signal to identify peak frequencies of received signals at said another device; and
   computing a difference between said identified peak frequencies of said received signals from each landmark on said another device.

7. The method as recited in claim 2 further comprising:
   identifying peak frequencies of signals from said another device by:
      estimating an auto-correlation matrix of said mixed signal;
      applying an eigenvalue decomposition to said auto-correlation matrix of said mixed signal;
      sorting eigenvectors obtained from said eigenvalue decomposition to said auto-correlation matrix of said mixed signal in descending order of corresponding eigenvalues' magnitudes;
      using a spaced spanned by said eigenvectors corresponding to a largest n eigenvalues to form a signal space matrix, wherein said n is less than M, wherein said M is an order of said auto-correlation matrix;
      using a spaced spanned by remaining eigenvectors to form a noise space matrix;
      defining a steering vector s(f) as $[1, e^{j2\pi ft}, \ldots, e^{j2\pi f(M-1)t}]^T$ where T stands for transpose of a matrix;
      defining a pseudo spectrum of said mixed signal using said noise space matrix and said steering vector; and
      identifying a peak frequency in said pseudo spectrum of said mixed signal.

8. The method as recited in claim 1 further comprising:
   constructing an optimization problem to minimize error in determining said location of said mobile device using said absolute distance between said mobile device and said another device and said velocity of said mobile device.

9. The method as recited in claim 8 further comprising:
   constructing an optimization problem to minimize error in determining said location of said mobile device using inertial measurement sensors.

10. The method as recited in claim 1 further comprising:
   generating a final estimated frequency shift by removing outliers and averaging remaining estimated frequency shifts.

11. The method as recited in claim 1 further comprising:
   estimating a difference in frequency offset between said mobile device and said another device.

12. A computer program product for tracking a mobile device, the computer program product comprising a computer readable storage medium having program code embodied therewith, the program code comprising the programming instructions for:
   estimating a reference position of said mobile device;
   fetching audio samples of audio signals at various frequencies from speakers over a duration of time;
   performing a fast Fourier transform in said fetched samples to extract frequencies;
   estimating a frequency shift in said extracted frequencies at one or more frequency ranges;

translating said estimated frequency shift to a velocity of said mobile device;

determining an absolute distance between said mobile device and another device using said reference position and a relative distance change between said mobile device and said another device;

determining a location of said mobile device based on said velocity of said mobile device and said absolute distance between said mobile device and said another device;

tracking said mobile device using said determined location of said mobile device; and controlling said another device by tracking said mobile device.

13. The computer program product as recited in claim 12, wherein the program code further comprises the programming instructions for:

mixing signal from said fetched samples with a pseudo transmitted signal.

14. The computer program product as recited in claim 13, wherein the program code further comprises the programming instructions for:

computing said relative distance change between said another device and said mobile device at two locations based on a change in frequencies of said mixed signal at said two locations.

15. The computer program product as recited in claim 13, wherein the program code further comprises the programming instructions for:

estimating a difference in relative distances between different speakers of said another device and said mobile device by performing a fast Fourier transform of said mixed signal to identify peak frequencies of received signals at said another device; and computing a difference between said identified peak frequencies of said received signals from each receiver on said another device.

16. The computer program product as recited in claim 13, wherein the program code further comprises the programming instructions for:

detecting a time when a Doppler shift changes its sign as a user moves said mobile device back and forth across landmarks on said another device; and estimating said reference position of said mobile device at said detected time based on a separation between different landmarks of said another device and a difference in relative distances between different landmarks of said another device and said mobile device.

17. The computer program product as recited in claim 16, wherein the program code further comprises the programming instructions for:

estimating said difference in relative distances between different landmarks of said another device and said mobile device by performing a fast Fourier transform of said mixed signal to identify peak frequencies of received signals at said another device; and computing a difference between said identified peak frequencies of said received signals from each landmark on said another device.

18. The computer program product as recited in claim 13, wherein the program code further comprises the programming instructions for:

identifying peak frequencies of signals from said another device by:

estimating an auto-correlation matrix of said mixed signal;

applying an eigenvalue decomposition to said auto-correlation matrix of said mixed signal;

sorting eigenvectors obtained from said eigenvalue decomposition to said auto-correlation matrix of said mixed signal in descending order of corresponding eigenvalues' magnitudes;

using a spaced spanned by said eigenvectors corresponding to a largest n eigenvalues to form a signal space matrix, wherein said n is less than M, wherein said M is an order of said auto-correlation matrix;

using a spaced spanned by remaining eigenvectors to form a noise space matrix;

defining a steering vector s(f) as $[1, e^{j2\pi ft}, \ldots, e^{j2\pi f(M-1)t}]^T$ where T stands for transpose of a matrix;

defining a pseudo spectrum of said mixed signal using said noise space matrix and said steering vector; and identifying a peak frequency in said pseudo spectrum of said mixed signal.

19. The computer program product as recited in claim 12, wherein the program code further comprises the programming instructions for:

constructing an optimization problem to minimize error in determining said location of said mobile device using said absolute distance between said mobile device and said another device and said velocity of said mobile device.

20. The computer program product as recited in claim 19, wherein the program code further comprises the programming instructions for:

constructing an optimization problem to minimize error in determining said location of said mobile device using inertial measurement sensors.

21. The computer program product as recited in claim 12, wherein the program code further comprises the programming instructions for:

generating a final estimated frequency shift by removing outliers and averaging remaining estimated frequency shifts.

22. The computer program product as recited in claim 12, wherein the program code further comprises the programming instructions for:

estimating a difference in frequency offset between said mobile device and said another device.

23. A mobile device, comprising:

a memory unit for storing a computer program for tracking said mobile device; and a processor coupled to the memory unit, wherein the processor is configured to execute the program instructions of the computer program comprising:

estimating a reference position of said mobile device;

fetching audio samples of audio signals at various frequencies from speakers over a duration of time;

performing a fast Fourier transform in said fetched samples to extract frequencies;

estimating a frequency shift in said extracted frequencies at one or more frequency ranges;

translating said estimated frequency shift to a velocity of said mobile device;

determining an absolute distance between said mobile device and another device using said reference position and a relative distance change between said mobile device and said another device;

determining a location of said mobile device based on said velocity of said mobile device and said absolute distance between said mobile device and said another device;

tracking said mobile device using said determined location of said mobile device; and controlling said another device by tracking said mobile device.

24. The mobile device as recited in claim 23, wherein the program instructions of the computer program further comprise:

mixing signal from said fetched samples with a pseudo transmitted signal.

25. The mobile device as recited in claim 24, wherein the program instructions of the computer program further comprise:

computing said relative distance change between said another device and said mobile device at two locations based on a change in frequencies of said mixed signal at said two locations.

26. The mobile device as recited in claim 24, wherein the program instructions of the computer program further comprise:

estimating a difference in relative distances between different speakers of said another device and said mobile device by performing a fast Fourier transform of said mixed signal to identify peak frequencies of received signals at said another device; and computing a difference between said identified peak frequencies of said received signals from each receiver on said another device.

27. The mobile device as recited in claim 24, wherein the program instructions of the computer program further comprise:

detecting a time when a Doppler shift changes its sign as a user moves said mobile device back and forth across landmarks on said another device; and estimating said reference position of said mobile device at said detected time based on a separation between different landmarks of said another device and a difference in relative distances between different landmarks of said another device and said mobile device.

28. The mobile device as recited in claim 27, wherein the program instructions of the computer program further comprise:

estimating said difference in relative distances between different landmarks of said another device and said mobile device by performing a fast Fourier transform of said mixed signal to identify peak frequencies of received signals at said another device; and computing a difference between said identified peak frequencies of said received signals from each landmark on said another device.

29. The mobile device as recited in claim 24, wherein the program instructions of the computer program further comprise:

identifying peak frequencies of signals from said another device by:

estimating an auto-correlation matrix of said mixed signal;

applying an eigenvalue decomposition to said auto-correlation matrix of said mixed signal;

sorting eigenvectors obtained from said eigenvalue decomposition to said auto-correlation matrix of said mixed signal in descending order of corresponding eigenvalues' magnitudes;

using a spaced spanned by said eigenvectors corresponding to a largest n eigenvalues to form a signal space matrix, wherein said n is less than M, wherein said M is an order of said auto-correlation matrix;

using a spaced spanned by remaining eigenvectors to form a noise space matrix;

defining a steering vector s(f) as $[1, e^{j2\pi f}, \ldots, e^{j2\pi f(M-1)}]^T$ where T stands for transpose of a matrix;

defining a pseudo spectrum of said mixed signal using said noise space matrix and said steering vector; and identifying a peak frequency in said pseudo spectrum of said mixed signal.

30. The mobile device as recited in claim 23, wherein the program instructions of the computer program further comprise:

constructing an optimization problem to minimize error in determining said location of said mobile device using said absolute distance between said mobile device and said another device and said velocity of said mobile device.

31. The mobile device as recited in claim 30, wherein the program instructions of the computer program further comprise:

constructing an optimization problem to minimize error in determining said location of said mobile device using inertial measurement sensors.

32. The mobile device as recited in claim 23, wherein the program instructions of the computer program further comprise:

generating a final estimated frequency shift by removing outliers and averaging remaining estimated frequency shifts.

33. The mobile device as recited in claim 23, wherein the program instructions of the computer program further comprise:

estimating a difference in frequency offset between said mobile device and said another device.

* * * * *